UNITED STATES PATENT OFFICE.

PERCY CARTER BELL, OF METUCHEN, NEW JERSEY, ASSIGNOR TO THE P. CARTER BELL COMPANY, OF NEW YORK, N. Y.

ELASTIC COMPOUND.

SPECIFICATION forming part of Letters Patent No. 626,479, dated June 6, 1899.

Application filed January 9, 1899. Serial No. 701,668. (No specimens.)

*To all whom it may concern:*

Be it known that I, PERCY CARTER BELL, a subject of the Queen of England, residing at Metuchen, in the county of Middlesex and State of New Jersey, have invented new and useful Improvements in Elastic Compounds, of which the following is a specification.

This invention relates to a composition of matter to produce an elastic material having substantially the characteristics of rubber and being serviceable in place of rubber or in conjunction therewith for the various purposes to which rubber is now applied.

My invention comprises the composition whose relative parts and approximate quantities will be described hereinafter, as also the process of compounding to produce the desired result.

The elements contained in my said elastic compound are vegetable oil, flour of sulfur, liquid tar, petroleum residue, and powdered talc. The quantities in which I employ the aforesaid elements in producing my elastic compound are approximately as follows: vegetable oil, fifty-nine parts; flour of sulfur, fifteen parts; liquid tar, one part; petroleum residue, twenty parts, and powdered talc, five parts. My process of combining the aforesaid elements in the quantities approximately as stated to derive therefrom the best result in the form of an elastic mass having substantially the qualities of rubber is as follows: I first place the petroleum residue in a suitable pan and cause it to be heated to 112° Fahrenheit. I then add the powdered talc and liquid tar to the heated petroleum residue and stir the mixture until it becomes smooth and uniform. I next add the vegetable oil gradually to retain the same temperature, stirring the mass meanwhile to thoroughly incorporate the vegetable oil with the other elements. When thoroughly mixed, the temperature of the mass is raised to 200° Fahrenheit, after which the flour of sulfur is gradually added, so as not to permit said temperature to be lowered. The elements having now all been included and thoroughly intermingled, I finally raise the temperature to 340° Fahrenheit and continually stir the complete mass until it becomes viscid, whereupon the operation or process is completed and it only remains to allow the mass to cool, when it will be found to comprise a very desirable form of elastic compound and be ready for use.

I wish it to be understood that while I have set forth the elements comprising my improved elastic compound and have also stated the proportionate quantities of said elements and the different degrees of heat to be employed during the various steps of the process of manufacture with which I have been able to produce the best result I consider that my invention includes any modification comprising a substitution for any of the said parts by an equivalent thereof, and it also includes any reasonable variation in the proportionate quantities of the parts and the degrees of heat employed as named by me, such changes being within the scope of my said invention.

I claim—

1. An elastic compound consisting of vegetable oil, flour of sulfur, liquid tar, petroleum residue and powdered talc in suitable proportions united with the aid of heat.

2. An elastic compound comprising the following elements in approximately the proportions named, to wit: vegetable oil, fifty-nine parts, flour of sulfur, fifteen parts, liquid tar, one part, petroleum residue, twenty parts, and powdered talc, five parts.

3. A process of uniting the following elements of an elastic compound, namely, a suitable quota of petroleum residue heated to 112° Fahrenheit; the admixture of suitable quotas of powdered talc and liquid tar thereto; the subsequent and gradual addition of a suitable quota of vegetable oil while maintaining the same temperature; next raising the temperature to 200° Fahrenheit, then adding a suitable quota of flour of sulfur; and finally raising the temperature to 340° Fahrenheit and continually stirring the mass until viscid, when it is allowed to cool.

In testimony whereof I have hereunto set my hand in the presence of two subscribing witnesses.

P. CARTER BELL.

Witnesses:
 L. T. SULLIVAN,
 F. W. BARKER.